March 11, 1930.  F. R. KLAUS  1,750,477

DEMOUNTABLE RIM

Filed June 26, 1925

Inventor
F. R. Klaus
By Lloyd L. Evans
Attorney

Patented Mar. 11, 1930

1,750,477

UNITED STATES PATENT OFFICE

FRED R. KLAUS, OF WARREN, OHIO, ASSIGNOR, BY MESNE ASSIGNMENTS, TO THE GOODYEAR TIRE & RUBBER COMPANY, OF AKRON, OHIO, A CORPORATION OF OHIO

DEMOUNTABLE RIM

Application filed June 26, 1925. Serial No. 39,689.

This invention relates to demountable rims formed of associated sections which are separable to permit a tire being readily applied or removed therefrom.

In rims of the character described it is customary to provide a continuous annular section and a transversely split annular section which can be assembled laterally to provide a rigid rim structure for carrying a tire upon a felly. The split section is compressible radially to separate the rim sections for the assembly or removal of the tire. A releasable locking means is usually provided to maintain the ends of the split rim section together when the rim is assembled, and means must also be provided to prevent the assembled rim from creeping annularly when assembled upon the felly.

An object of my invention is to provide a simple adjustable device for a rim which can be utilized to lock the ends of a transversely split section of a rim in fixed relation, and also to prevent annular movement of the rim relative to the felly.

A further object of my invention resides in a simple removable locking device for securing the ends of a split rim section together.

Another object of my invention is to provide a unitary valve stem housing and a driving lug structure which can be readily applied and removed from a rim.

Still another object of my invention resides in providing a rim structure with a valve stem housing which can be removed to increase the size of the valve stem opening in the rim and thereby permit an increased lateral movement of the stem when applying or removing the tire from the rim.

These and other objects will appear more fully in the following specification.

Figure 1:
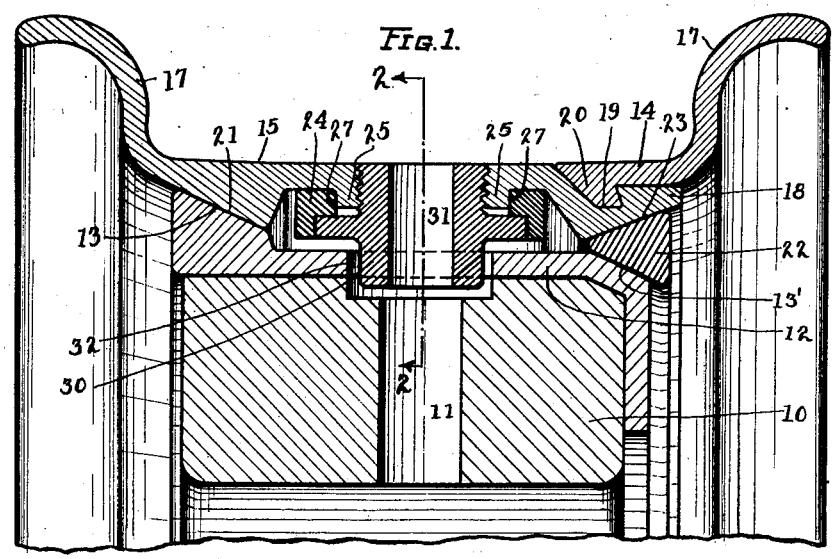
Figure 2:
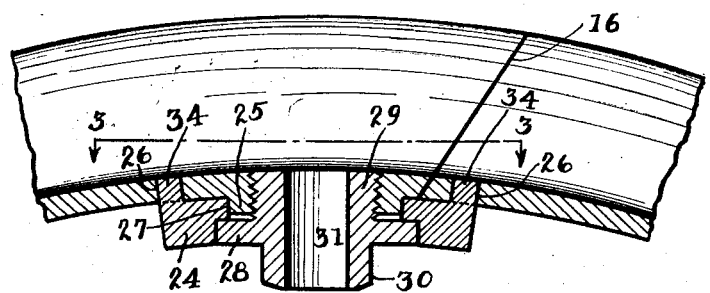
Figure 3:
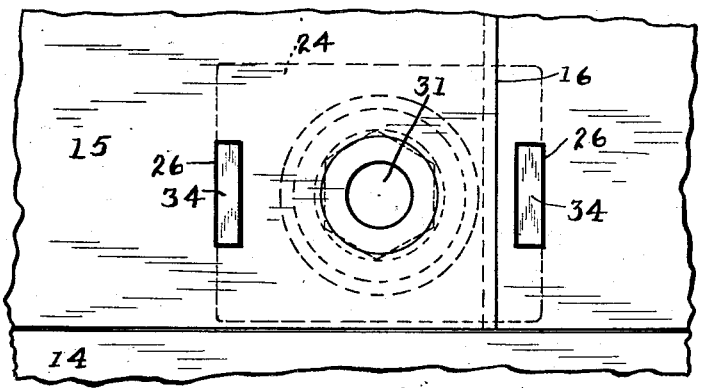

In the accompanying drawings, Figure 1 is a transverse sectional view through a rim having my invention associated therewith; Figure 2 is a longitudinal sectional view taken on line 2—2 of Figure 1; and Figure 3 is a fragmentary plan view of the rim showing the locking plate and valve housing structures associated therewith.

Referring now to the drawings by characters of reference, 10 represents an annular wheel felly having a valve stem passage 11 extending therethrough. A conventional form of annular rim 12 is fixed upon the felly and is provided with angularly disposed annular bearing faces 13, 13' upon which the tire carrying rim is assembled.

The tire carrying rim is comprised of two annular sections, one section 14 of which is endless and the other section 15 of which is formed in one piece and transversely split at 16. The outer edges of the sections are formed with annular tire retaining flanges 17, while the inner edges are formed so that they will interlock to prevent relative lateral displacement when the sections are assembled. The section 15 is formed with an inwardly extending portion 18 having an annular shoulder and formed with a peripheral annular channel 19 between the shoulder and the section 15. The side walls of the channel 19 extend at an oblique angle toward the plane of the wheel thus forming an oblique channel adapted to receive the annular tongue 20 which extends interiorly from the base of the section 14 and which is complementary in form to the channel 19. When the sections are assembled to carry and retain a tire thereon, the rim is moved laterally over the fixed rim until the bearing face 21 of the section 15 wedges against the face 13. A wedge ring 22 is then placed intermediate the other bearing face 13' of the fixed rim and the annular bearing face 23 of the rim section 14, and customary clamps are provided to wedge the ring in position to retain the demountable rim upon the fixed rim.

The rim section 15 is split at an angle and the ends thus formed are secured together by a removable locking plate 24. The locking plate is preferably rectangular in outline and is provided with an annular aperture 27 substantially centrally thereof, and with a pair of upturned flanges 34 which extend partially across the ends thereof. The inner side of the split rim is provided with an apertured boss 25 adjacent one end, which boss is of substantially the same diameter as the aperture in the lock plate. The base of the split rim section is provided, adjacent each end, with transversely extending slots 26 into which the flanges 34 of the lock plate can be inserted when the rim section is contracted with the ends adjacent each other.

The aperture in the boss 25 extends through the rim base and the wall thereof is threaded. The annular aperture 27 in the locking plate is of larger diameter adjacent the underside to provide a seat for the flange 28 which extends from the valve stem housing and lug member 29. One end of the housing member is threaded externally and screws into the threaded aperture in the boss 25, while the other end 30 of the housing member projects beyond the flange and is hexagonal in shape to provide a purchase for rotating the member 29, and as a driving lug. The combined housing and lug are provided with a passage 31 through which the valve stem of the tire will extend. The fixed rim and the felly are provided with a recess 32 into which the driving lug projects and engages to prevent annular movement of the demountable rim relative to the felly.

When the tire has been placed upon the rim sections and the rim sections have been placed in lateral arrangement, the split rim section is contracted until the ends are adjacent each other, whereupon the lugs 34 of the locking plate can be placed in the apertures 26 and the housing lug member 29 is then screwed into the boss 25 until the flange 28 engages the plate and wedges it against the base of the split rim section. The sectional rim is then placed upon the fixed rim with the valve stem extending through the passage in the felly and the lug 30 lying in the recess 32 in the felly and fixed rim, whereupon the retaining ring and the lugs can be applied to prevent lateral displacement of the assembled rim.

When the housing member 29 is removed, during application or removal of the tire, the valve stem will be free to be moved laterally the width of the aperture in the boss and rim. This larger aperture is of especial advantage in applying and removing large tires, or tires designed to run with a low air pressure because of the greater lateral movement permitted in application and removal from the rim section. It will be seen that with the form of locking plate described, the ends of the split rim section will be held together against relative radial movement to form a rigid annular rim section when the locking plate is tightly secured against the inner faces of the rim adjacent the split.

It will be observed that two elements provide the valve housing, driving lug, and locking plate for a rim, and that their adjustability permits the ends of the split rim section to readily expand to annular form, as well as to permit a greater lateral movement of the valve stem when assembling the tire upon the rim.

It will also be seen that the rim may be diagonally split at 16 if desired.

Various changes can be made in the structure described without departure from the spirit of my invention and the scope of the claims.

What I claim is:—

1. In a demountable rim structure, the combination of a transversely split rim section having apertures in its base adjacent its ends, an inwardly extending threaded boss adjacent one end of said rim, a locking plate arranged on the inner side of said rim section adapted to engage said apertures and said boss, and threaded means engaging said boss to removably secure said locking plate against the base of said rim.

2. In a demountable rim structure, the combination of a transversely split rim section having apertures in its base adjacent its ends, an inwardly extending threaded boss adjacent one end of said rim, a locking plate arranged on the inner side of said rim section adapted to engage said apertures and said boss, and threaded means engaging said boss to removably secure said locking plate against the base of said rim, said threaded means being recessed to receive a valve stem.

3. In a demountable rim structure, the combination of a transversely split rim section having apertures in its base adjacent its ends, an inwardly extending threaded boss adjacent one end of said rim, a locking plate adapted to fit said boss and having flanges to engage said apertures, said locking plate being recessed upon its inner face, a threaded member adapted to engage the threaded portion of said boss and having an extension flange adapted to be seated in said recess whereby said locking plate can be removably held in close engagement with the base of said rim and said boss.

4. In a rim structure, the combination of a transversely split rim section having apertures in the base of said section adjacent its ends, a locking plate extending across the inner face of the ends of the rim section and having flanges for engaging the apertures and a securing member adjustably associated with said rim for securing said plate against both ends of the rim section to prevent relative inward radial movement of the rim ends, said removable securing member having an aperture therethrough for slidably receiving a valve stem.

5. In a demountable rim structure, the combination of a separable transversely split rim section, a locking member spanning the ends of and engaging the base of the rim section adjacent thereto, and a housing apertured to slidably receive a valve stem and adjustably connected to the section to clamp the member in locking relation to the section.

6. In a demountable rim structure, the combination of a separable transversely split rim section, a removable locking member for spanning the ends of and engaging the base of the section adjacent the ends to prevent relative inward radial movement of the ends of the section, and a valve stem housing adjustably connected to the section, said housing traversing the locking member and having a flange for clamping the locking member in engagement with the rim section.

7. In a demountable rim structure, the combination of a separable transversely split rim section, a removable locking member for spanning the ends of and engaging the rim section, and a removable member threaded into the section and engaging the locking member to clamp the latter in engagement with the section.

8. In a demountable rim structure, the combination of a transversely split rim section, a removable locking member spanning the ends of and engaging the section, and a removable member threaded into the section and engaging the locking member to clamp the latter in engagement with the section, the end of the member removed from the section constituting a driving lug.

In testimony whereof I hereunto affix my signature.

FRED R. KLAUS.